US007110725B2

(12) United States Patent
Kent

(10) Patent No.: US 7,110,725 B2
(45) Date of Patent: Sep. 19, 2006

(54) METHOD AND APPARATUS FOR MULTIPATH SIGNAL DETECTION, IDENTIFICATION, AND MONITORING FOR WIDEBAND CODE DIVISION MULTIPLE ACCESS SYSTEMS

(75) Inventor: Mark Kent, Vista, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 10/096,429

(22) Filed: Mar. 12, 2002

(65) Prior Publication Data

US 2002/0127987 A1 Sep. 12, 2002

Related U.S. Application Data

(60) Provisional application No. 60/275,032, filed on Mar. 12, 2001.

(51) Int. Cl.
*H04B 1/40* (2006.01)
(52) U.S. Cl. ............................ 455/85; 455/87; 455/255; 455/258; 370/350; 370/331
(58) Field of Classification Search ................ 455/343, 455/38.3, 574, 343.5, 343.4, 208, 502, 75, 455/78, 255, 258; 370/311, 354, 151, 144, 370/335, 350, 331; 340/7.32, 7.37; 375/354
See application file for complete search history.

(56) References Cited

U.S. PATENT DOCUMENTS

| 4,302,829 | A  | * | 11/1981 | Morokawa et al. ............ 368/82 |
| 5,560,024 | A  | * | 9/1996  | Harper et al. ................ 713/322 |
| 6,029,061 | A  | * | 2/2000  | Kohlschmidt ................ 455/343 |
| 6,088,602 | A  | * | 7/2000  | Banister ...................... 455/574 |
| 6,173,164 | B1 | * | 1/2001  | Shah ........................ 455/182.1 |
| 6,385,268 | B1 |   | 5/2002  | Fleming et al. ............... 375/377 |
| 6,473,607 | B1 | * | 10/2002 | Shohara et al. ............ 455/343.1 |
| 6,501,300 | B1 | * | 12/2002 | Hatae ........................... 326/93 |
| 6,564,046 | B1 | * | 5/2003  | Chateau ...................... 340/7.32 |
| 6,615,060 | B1 | * | 9/2003  | Usui ........................... 455/574 |
| 6,725,067 | B1 | * | 4/2004  | Marx et al. .................. 455/574 |
| 2005/0043068 | A1 | * | 2/2005 | Shohara et al. .............. 455/574 |

* cited by examiner

*Primary Examiner*—Danh Cong Le
(74) *Attorney, Agent, or Firm*—Thomas, Kayden, Horstemeyer & Risley, LLP

(57) ABSTRACT

Methods to generate a mobile time reference are provided. A representative method includes providing a high frequency clock, providing a low frequency clock, generating a mobile time reference using the high frequency clock, maintaining the mobile time reference using the low frequency clock when the high frequency clock is turned off, and continuing to generate the mobile time reference using the high frequency clock when the high frequency clock has been turned back on. Systems and other methods are also provided.

18 Claims, 4 Drawing Sheets

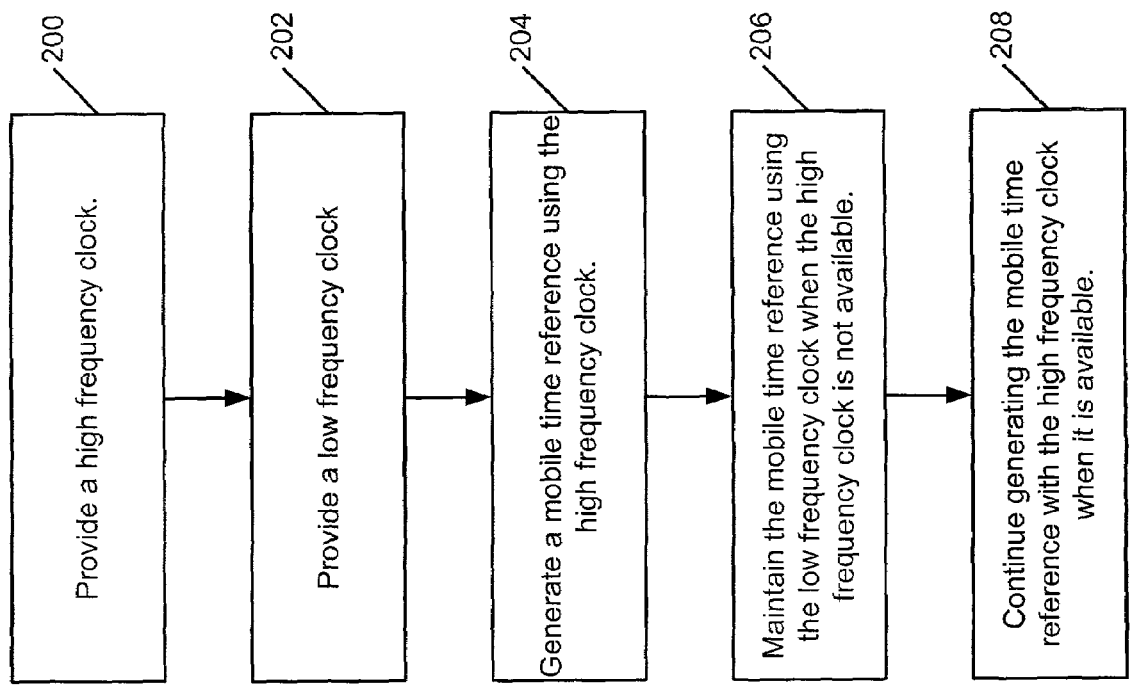

METHOD AND APPARATUS FOR MULTIPATH SIGNAL DETECTION, IDENTIFICATION, AND MONITORING FOR WIDEBAND CODE DIVISION MULTIPLE ACCESS SYSTEMS

CROSS REFERENCE TO RELATED APPLICATIONS

This application claims the benefit of and priority to U.S. Provisional Patent Application Ser. No. 60/275,032, entitled "Method and Apparatus for Multipath Signal Detection, Identification, and Monitoring for WCDMA Systems," filed Mar. 12, 2001, which is incorporated herein by reference in its entirety.

BACKGROUND OF THE INVENTION

1. Field of Invention

The present invention is generally related to wireless communication systems and, more particularly, is related to systems and methods for detection, identification, and monitoring of multipath signals in wideband code division multiple acess (WCDMA) systems.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld telephone like communication handset. The different modulation and transmission schemes each have advantages and disadvantages.

The next generation of wireless communication is referred to as 3G, which stands for third generation. 3G refers to pending improvements in wireless data and voice communications through a variety of proposed standards. One goal of 3G systems is to raise transmission speeds from 9.5 kilobits (Kbits) to 2 megabits (Mbits) per second. 3G also adds a mobile dimension to services that are becoming part of everyday life, such as Internet and intranet access, videoconferencing, and interactive application sharing. This advancement in wireless communication necessitates improvements in the area of signal detection, identification, and monitoring of multipath signals, which are two or more identical signals from the same antenna reaching the receiver at different times due to taking different paths from the antenna to the receiver.

SUMMARY

The present invention provides a method and system for generating a mobile time reference for a portable transceiver. Briefly described, one embodiment of the system comprises an antenna, a radio frequency subsystem, and a baseband subsystem. The radio frequency subsystem is coupled to the antenna and includes a high frequency oscillator and a low frequency oscillator. The baseband subsystem is coupled to the radio frequency subsystem and includes a free running counter coupled to the high frequency oscillator and the low frequency oscillator. The free running counter provides a mobile time reference to the system and has a wake mode and a sleep mode. During the wake mode the free running counter uses the high frequency oscillator to generate the mobile time reference, and during the sleep mode the free running counter uses the low frequency oscillator to maintain the mobile time reference.

The present invention can also be viewed as providing a method of generating a mobile time reference. In this regard, one embodiment of such a method, can be broadly summarized as including the steps of providing a high frequency clock, providing a low frequency clock, generating a mobile time reference using the high frequency clock, maintaining the mobile time reference using the low frequency clock when the high frequency clock is not available, and continuing to generate the mobile time reference using the high frequency clock when the high frequency clock is again available.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a flow diagram of one embodiment of a method of providing a mobile time reference.

DETAILED DESCRIPTION

Figure 1:
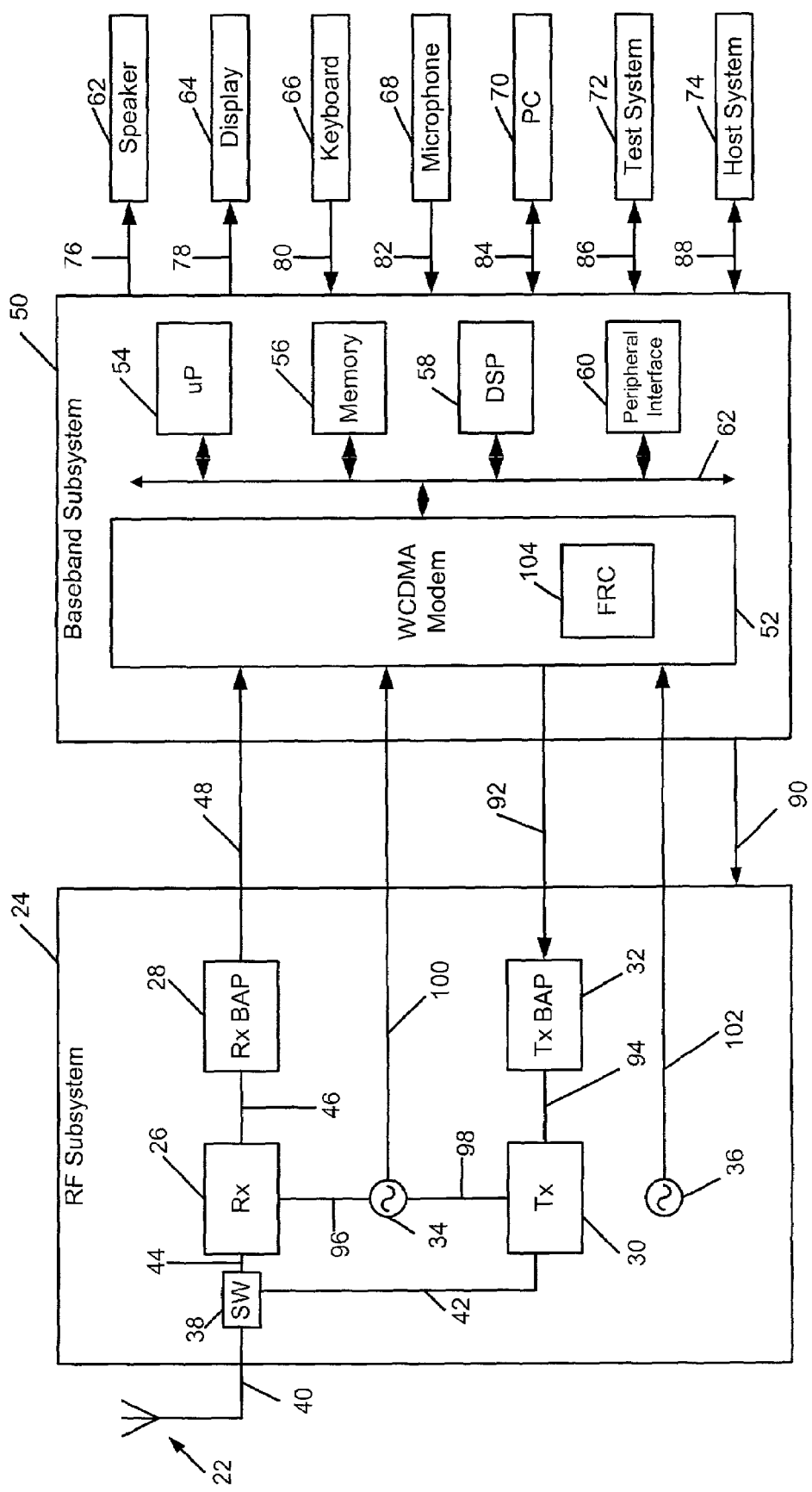
FIG. 1 is a block diagram illustrating one embodiment of a third generation portable transceiver according to the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the scope of the invention as defined by the appended claims.

FIG. 1 is a block diagram illustrating a simplified 3G portable transceiver 20. In one embodiment, portable transceiver 20 can be, for example but not limited to, a portable telecommunication handset such as a mobile cellular-type telephone. Portable transceiver 20 includes antenna 22 connected to radio frequency subsystem 24. RF subsystem 24 includes receiver 26, receiver baseband analog processor (BAP) 28, transmitter 30, transmitter BAP 32, high frequency oscillator (which may be implemented as a temperature controlled crystal oscillator (TCXO)) 34, low frequency oscillator (which may be a 32 KHz crystal oscillator (CO)) 36, and transmitter/receiver switch 38.

Antenna 22 transmits signals to and receives signals from switch 38 via connection 40. Switch 38 controls whether a transmit signal on connection 42 from transmitter 30 is transferred to antenna 22 or whether a received signal from antenna 22 is supplied to receiver 26 via connection 44. Receiver 26 receives and recovers transmitted analog information of a received signal and supplies a signal representing this information via connection 46 to receiver BAP 28. Receiver BAP 28 converts these analog signals to a digital signal at baseband frequency and transfers it via bus 48 to baseband subsystem 50.

Baseband subsystem 50 includes WCDMA modem 52, microprocessor 54, memory 56, digital signal processor (DSP) 58, and peripheral interface 60 in communication via bus 62. Bus 62, although shown as a single bus, may be implemented using multiple busses connected as necessary among the subsystems within baseband system 50. WCDMA modem 52, microprocessor 54, memory 56, and DSP 58 provide the signal timing, processing, and storage functions for portable transceiver 20. Memory 56 may include dual port random access memory (RAM) shared by microprocessor 54 and DSP 58.

Peripheral interface 60 provides connection to baseband subsystem 50 for a variety of items. These items may include, but are not limited to, devices that are physically part of portable transceiver 20, such as speaker 62, display 64, keyboard 66, and microphone 68, and devices that would be externally connected to portable transceiver 20, such as personal computer (PC) 70, test system 72, and host system 74. Speaker 62 and display 64 receive signals from baseband subsystem 50 via connections 76 and 78, respectively, as known to those skilled in the art. Similarly, keyboard 66 and microphone 68 supply signals to baseband subsystem 50 via connections 80 and 82, respectively. PC 70, test system 72, and host system 74 all receive signals from and transmit signals to baseband subsystem 50 via connections 84, 86, and 88, respectively.

Baseband subsystem 50 provides control signals to RF subsystem 24 via connection 90. Although shown as a single connection 90, the control signals may originate from WCDMA modem 52, microprocessor 54, or DSP 58, and are supplied to a variety of points within RF subsystem 24. These points include, but are not limited to, receiver 26, receiver BAP 28, transmitter 30, transmitter BAP 32, TCXO 34, and switch 38.

WCDMA modem 52 receives the digital signal from receiver BAP 28 on bus 48 and provides a digital signal to transmitter BAP 32 on bus 92. Transmitter BAP 32 converts this digital signal to an analog signal at radio frequency for transmission on connector 94 to receiver 30. Receiver 30 generates the transmit signal which is provided to antenna 22 via connectors 40, 42 and switch 38. The operation of switch 38 is controlled by a control signal from baseband subsystem 50 via connection 90.

In accordance with an embodiment of the invention, TCXO 34 provides a clock to receiver 26, transmitter 30, and WCDMA modem 52 via connectors 96, 98, and 100, respectively, and CO 36 provides on connector 102 a 32 KHz clock to WCDMA modem 52. These two clocks are used by WCDMA modem 52 to create a mobile time reference. This mobile time reference is constantly running and has an accuracy of approximately 32 nanoseconds.

Figure 2:
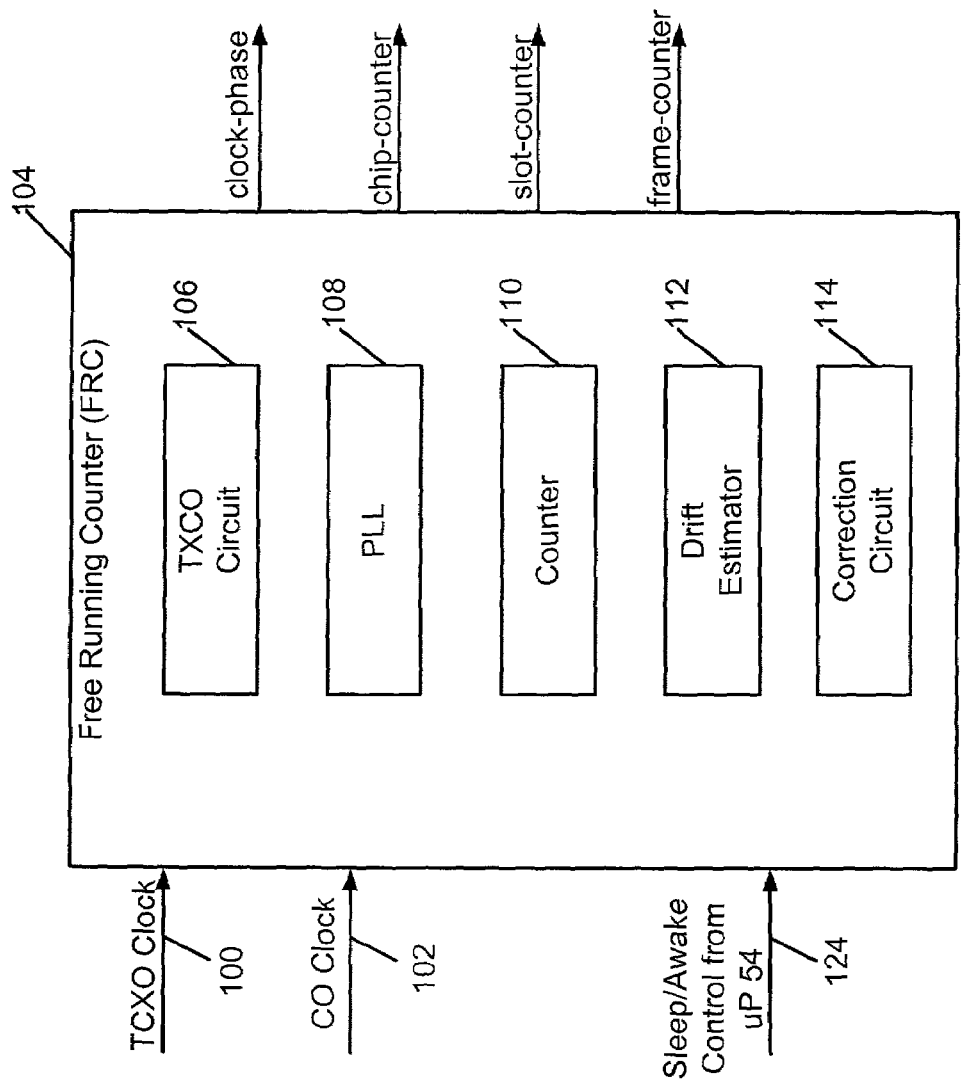
FIG. 2 is a block diagram of a free running counter in the WCDMA modem of FIG. 1.

Referring now to FIG. 2, a portion of WCDMA modem 52 is shown illustrating free running counter (FRC) 104 which generates the mobile time reference for use by portable transceiver 20. FRC 104 is provided with a clock signal from the TCXO on line 100 and a clock signal from the CO on line 102. The clock signal from the TCXO on line 100 can be a 30.72 MHz, and the clock signal from the CO on line 102 can be 32 KHz. FRC 104 includes TCXO circuit 106, phase locked loop (PLL) 108, counter 110, drift estimator 112, and correction circuit 114. TXCO circuit 106 using the 30.72 MHz clock generates the mobile time reference. The 32 kHz clock is phase locked to the 30.72 MHz clock for improved performance using PLL 108. Counter 110 counts the cycles of the 32 KHz clock. Drift estimator 112 provides an estimate of the drift of the 32 KHz clock for use by correction circuit 114. The estimate of drift includes both the drift and bias of the clock as provided by a Kalman estimation as known to those having ordinary skill in the art. FRC 104 operates in two time domains, 30.72 MHz or 32 KHz, depending on whether the portable transceiver 20 is in active mode or idle mode, respectively.

In active mode the portable transceiver is actively transmitting, receiving, processing, or looking for signals. During idle mode the portable transceiver powers down most of its circuits to conserve power. The CO 36 is always on providing a continuous 32 KHz clock signal to FRC 104, but the TCXO 34 is turned off during idle mode.

Figure 3:
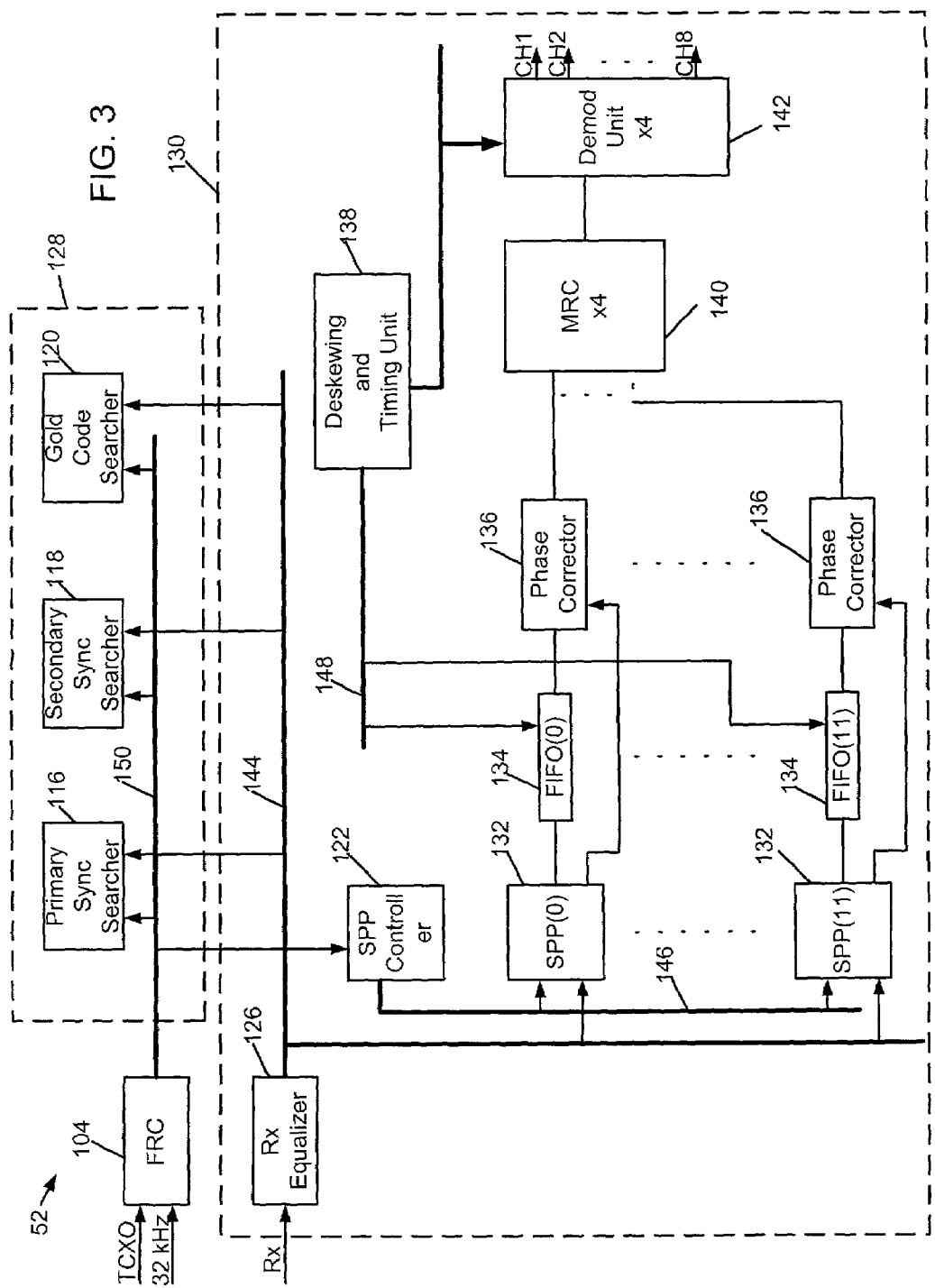
FIG. 3 is a block diagram of the WCDMA modem of FIG. 1 including the multipath monitor and multipath radio signal recovery circuit.

Now referring to FIG. 3, a block diagram of the WCDMA modem 52 is shown. When the portable transceiver is in active mode, FRC 104 provides the mobile time reference including clock-phase, chip-counter, and slot-counter on bus 150 to primary sync searcher 116, secondary sync searcher 118, gold code searcher 120, and single-path processor (SPP) controller 122 as shown in FIG. 3. A 10 millisecond radio frame is divided into 15 slots (slot-counter 0–14). Each slot includes 2,560 chips (chip counter 0–2,559). Each chip contains 8 ticks (clock-phase 0–7). FRC 104 also generates a frame counter (0–511) for the mobile time reference by counting the frames that occur within a 5.12 second period. Also, the drift estimate is continually updated when the portable transceiver is in active mode.

When transitioning into the idle mode, a sleep/awake control signal on line 124 from the microprocessor to FRC 104 transitions to a low state. Counter 110 is reset and begins counting the rising edges of the 32 KHz clock signal. At the next rising edge of the 32 KHz clock after the sleep/awake control signal transitions to a low state, the current mobile time reference and drift estimate from TXCO circuit 106 is provided to correction circuit 114. At this time the portable transceiver goes into idle mode. During each subsequent count, correction circuit 114 updates the mobile time reference using the count and the drift estimate. Thus, the mobile time reference and drift estimate is maintained during the idle mode.

When transitioning to the active mode, the sleep/awake control signal transitions to a high state. At the next rising edge of the 32 KHz clock, the updated mobile time reference maintained in correction circuit 114 is provided to TCXO circuit 106 and FRC 104 begins providing the mobile time reference for the portable transceiver using the 30.72 MHz clock and the updated mobile time reference as a starting point.

The idle time may extend into a number of seconds, and the active time with no paging detected could be as long as 5 milliseconds. Maintaining the mobile time reference during idle mode allows the portable transmitter to quickly transition to an active state, which translates into a shorter duration in the active state, thus reducing power consumption and extending battery life. Maintaining the mobile time reference to a 32 nanosecond accuracy improves the efficiency of detecting, identifying, and monitoring the incoming multipath signals.

The FRC provides a timing reference for the portable transceiver system and for acquiring the parameters required to recover the multipath signals and operate a nultipath signal receiver.

WCDMA modem 52 includes FRC 104, receiver equalizer 126, multipath monitor 128, and multipath radio signal recovery circuit 130. The mobile time reference from FRC 104 is provided to both multipath monitor 128, such as a code acquisition system, and multipath radio signal recovery circuit 130, such as a RAKE receiver as known to those having ordinary skill in the art. The digital signal from the receiver BAP 28 is provided to receiver equalizer 126 and equalized prior to being provided on bus 144 to multipath monitor 128 and multipath radio signal recovery circuit 130.

Multipath monitor 128 includes primary sync searcher 116, secondary sync searcher 118, and gold code searcher 120, and provides information regarding these searches to the microprocessor.

In one embodiment, multipath radio signal recovery circuit 130 includes SPP controller 122, twelve SPPs 132, twelve first-in first-out (FIFO) circuits 134, twelve phase correctors 136, deskewing and timing controller (DTC) 138, four maximal rate combiners (MRC) 140, and four demodulation units 142.

SPP controller 122 maps up to twelve multipath signals to SPPs 132 and provides a start command on bus 146 to each of the SPPs 132. Each SPP recovers and tracks incoming clock information relative to a basestation, provides the clock information to DTC 138, and provides phase estimation for both single and multiple basestation antennas to the corresponding phase corrector 136. The clock information provided to DTC 138 is in the same form as the mobile time reference having a clock-phase, a chip-counter, and a slot-counter. The mapped equalized signal is passed through each SPP 132 to the corresponding FIFO 134. Each FIFO 134 has a subperiod of 512 chips. Each radio frame includes 38,400 chips or seventy-five subperiods of 512 chips.

DTC 138 using the clock information from each of SPPs 132 provides a read address and read strobe signal from bus 148 to each SPP, which time aligns the outputs of FIFOs 134 relative to one another. The operation of DTC 138 is a complex PLL operation. The output of each FIFO 134 is provided to the corresponding phase corrector 136 which corrects the phase of the signal using the phase estimation provided by the corresponding SPP 132. The outputs of each phase corrector 136 is mapped to one of the four MRCs 140. Each MRC 140 combines the signals mapped to it to increase the strength of the signal. The strengthened signal from each MRC 140 is provided to the corresponding demodulation unit 142. Demodulation unit 142 recovers information from the signal on up to eight channels. Thirty-two different channels are provided for information recovery.

One of the benefits of the above recovery system is that the information is not recovered from the signals until the signals are time aligned improving the efficiency of the recovery. Another benefit is that signals from either or both of the antennas from a basestation can be utilized and mapped to an SPP. Still another benefit is the ability to align the signals from asynchronous basestations, i.e. basestations operating using different clocks.

The present invention provides a wideband spread spectrum multipath signal detector, identification mechanism, and multipath monitoring technique that monitors signal strength from a plethora of asynchronous transmitters within a network in the presence of a moving time base, slotted operations, and effects of the mobile radio channel. The time base is moving with movement of the portable transceiver. Slotted operations are utilized to spread the required processing out over multiple active periods. The system performs matched filtering of the primary synchronization code and creates a non-coherent energy measurement that is transformed into the log2-domain to reduce memory requirements for multiple hypotheses of slot level timing. Hypotheses are low pass filtered to enhance the probability of detection of signals that are candidates for further processing. The system recovers the transmitted code groups and frame timing for the received signal components. A parallel set of correlators performs the final identification of the despreading code over all possible codes in parallel. Timing is maintained in the system through use of Kalman estimation that recovers clock drift and bias when utilizing low cost crystals for standby, low power consumption, and slotted operations.

A fast wakeup mechanism recovers multiple hypotheses in parallel to arrive quickly at a time base that can initiate subsequent demodulation of the spread spectrum signal, thus reducing power consumption and minimizing duty cycle of the slotted mode operations. A method for recovery of network timing in the presence of frequency uncertainty, that uses energy measurements form the primary synchronization code, allows user equipment to detect, identify, and perform subsequent demodulation of the downlink signal.

Referring now to FIG. 4, one embodiment of a method of providing a mobile time reference for the portable transceiver of FIG. 1 is shown. Initially, a high frequency clock (30.72 MHz) is provided by a temperature controlled crystal oscillator as shown in block 200. In block 202, a low frequency clock is provided by a crystal oscillator operating at 32 KHz. A mobile time reference is generated using the high frequency clock in block 204. The mobile time reference includes a clock-phase signal, a chip-counter, a slot-counter, and a frame-counter. As shown in block 206, the mobile time reference is maintained using the low frequency clock, when the high frequency clock is not available. Finally, when the high frequency clock is again available, the mobile time reference continues to be generated with the high frequency clock and the maintained mobile time reference as a starting point in block 208.

The low frequency clock is phase locked to the high frequency clock, and an estimate of the drift and bias of the low frequency clock is made using a Kalman estimation. During the step of maintaining the mobile time reference, the mobile time reference is updated using the cycles of the low frequency clock counted when the high frequency clock is not available and the estimated drift/bias of the low frequency clock.

Although an exemplary embodiment of the present invention has been shown and described, it will be apparent to those of ordinary skill in the art that a number of changes, modifications, or alterations to the invention as described may be made, none of which depart from the scope of the present invention. All such changes, modifications, and alterations should therefore be seen as within the scope of the present invention.

What is claimed is:

1. A method of providing a mobile time reference in a portable transceiver system, comprising:
   providing a high frequency clock;
   providing a low frequency clock;
   generating a mobile time reference using the high frequency clock;

updating at least twice the mobile time reference using the low frequency clock when the high frequency clock is not available; and continuing to generate the mobile time reference using the high frequency clock when the high frequency clock is available, wherein updating the mobile time reference includes counting cycles of the low frequency clock and adding in a drifting estimate.

2. The method of claim 1, wherein the mobile time reference includes at least one of a clock-phase, a chip-counter, a slot-counter, and a frame-counter.

3. The method of claim 1, wherein the high frequency clock is generated by a temperature controlled crystal oscillator.

4. The method of claim 1, wherein the high frequency clock provides a signal of at least 30 MHz.

5. The method of claim 1, wherein the mobile time reference has an accuracy of at least 32 nanoseconds.

6. The method of claim 1, wherein the low frequency clock is generated by a crystal oscillator.

7. The method of claim 1, wherein the low frequency clock provides a 32 KHz signal.

8. The method of claim 1, farther comprising estimating the drift of the low frequency clock.

9. A portable transceiver system comprising:

an antenna;

a radio frequency subsystem coupled to the antenna and including a high frequency oscillator and a low frequency oscillator; and a baseband subsystem coupled to the radio frequency system and including a free running counter coupled to the high frequency oscillator and the low frequency oscillator, the free running counter providing a mobile time reference to the system and having an active mode and an idle mode, during the active mode the free running counter uses the high frequency oscillator to generate the mobile time reference, and during the idle mode the free running counter uses the low frequency oscillator to update at least twice the mobile time reference, wherein the baseband subsystem includes a multi-path signal recovery circuit and the mobile time reference is provided to the multipath signal recovery circuit.

10. The system of claim 9, wherein the high frequency oscillator is a temperature controlled crystal oscillator.

11. The system of claim 9, wherein the low frequency oscillator is a crystal oscillator.

12. The system of claim 11, wherein the crystal oscillator provides a 32 KHz clock.

13. The system of claim 9, wherein the baseband subsystem includes a multipath monitor and the mobile time reference is provided to the multipath monitor.

14. The system of claim 9, wherein the mobile time reference is constantly available.

15. The system of claim 9, wherein the mobile time reference has an accuracy of at least 32 nanoseconds.

16. The system of claim 9, wherein the free running counter includes a phase locked loop coupling the low frequency oscillator to the high frequency oscillator.

17. The system of claim 9, wherein the free running counter includes a drift estimator for the low frequency oscillator.

18. A portable transceiver system comprising:

an antenna;

a radio frequency subsystem coupled to the antenna and including a high frequency oscillator and a low frequency oscillator; and a baseband subsystem coupled to the radio frequency system and including a means for providing a free running counter coupled to the high frequency oscillator and the low frequency oscillator, the means for providing a free running counter further including means for providing a mobile time reference to the system and having an active mode and an idle mode, during the active mode the means for providing a mobile time reference uses the high frequency oscillator to generate the mobile time reference, and during the idle mode the means for providing a mobile time reference uses the low frequency oscillator to update at least twice the mobile time reference, the means for providing a mobile time reference comprising means for counting the cycles of the low frequency clock and means for adding in a drift estimate of the low frequency clock.

* * * * *

UNITED STATES PATENT AND TRADEMARK OFFICE
CERTIFICATE OF CORRECTION

| | | |
|---|---|---|
| PATENT NO. | : 7,110,725 B2 | Page 1 of 1 |
| APPLICATION NO. | : 10/096429 | |
| DATED | : September 19, 2006 | |
| INVENTOR(S) | : Mark Kent | |

It is certified that error appears in the above-identified patent and that said Letters Patent is hereby corrected as shown below:

Column 7, line 32 - substitute --subsystem-- for "system".
Column 8, line 27 - substitute --subsystem-- for "system".

Signed and Sealed this

Nineteenth Day of December, 2006

JON W. DUDAS
*Director of the United States Patent and Trademark Office*